(12) United States Patent
Tran et al.

(10) Patent No.: US 11,751,742 B2
(45) Date of Patent: Sep. 12, 2023

(54) VACUUM CLEANER

(71) Applicant: BISSELL Inc., Grand Rapids, MI (US)

(72) Inventors: Phong Hoang Tran, Grand Rapids, MI (US); Todd Richard VanTongeren, Ada, MI (US)

(73) Assignee: BISSELL Inc., Grand Rapids, MI (US)

( * ) Notice: Subject to any disclaimer, the term of this patent is extended or adjusted under 35 U.S.C. 154(b) by 388 days.

(21) Appl. No.: 17/034,757

(22) Filed: Sep. 28, 2020

(65) Prior Publication Data
US 2021/0007568 A1 Jan. 14, 2021

Related U.S. Application Data

(63) Continuation of application No. 16/114,683, filed on Aug. 28, 2018, now Pat. No. 10,791,900.

(60) Provisional application No. 62/550,903, filed on Aug. 28, 2017.

(51) Int. Cl.
| | |
|---|---|
| *A47L 9/26* | (2006.01) |
| *A47L 5/34* | (2006.01) |
| *A47L 5/36* | (2006.01) |
| *H02G 11/02* | (2006.01) |
| *A47L 9/04* | (2006.01) |
| *A47L 9/12* | (2006.01) |
| *A47L 9/28* | (2006.01) |

(52) U.S. Cl.
CPC .................................. *A47L 9/26* (2013.01); *A47L 5/34* (2013.01); *A47L 5/365* (2013.01); *A47L 9/0444* (2013.01); *A47L 9/0494* (2013.01); *A47L 9/122* (2013.01); *A47L 9/2857* (2013.01); *H02G 11/02* (2013.01)

(58) Field of Classification Search
CPC ... A47L 9/26; A47L 5/34; A47L 5/365; A47L 9/0444; A47L 9/0494; A47L 9/122; A47L 9/2857; H02G 11/02
See application file for complete search history.

(56) References Cited

U.S. PATENT DOCUMENTS

| | | | | |
|---|---|---|---|---|
| 2,038,697 | A | * | 4/1936 | Winslow ............ A47L 9/325 |
| | | | | 280/47.11 |
| 3,332,637 | A | * | 7/1967 | Price ................... H02G 11/02 |
| | | | | 242/381.3 |

(Continued)

FOREIGN PATENT DOCUMENTS

| | | |
|---|---|---|
| DE | 102007040962 A1 | 3/2009 |
| GB | 2469710 A | 10/2010 |

(Continued)

OTHER PUBLICATIONS

Rhodri Evans, Patents Act 1977: Search Report under Section 17(5), 4 Pages, dated Jan. 30, 2019 South Wales.

(Continued)

*Primary Examiner* — Marc Carlson
(74) *Attorney, Agent, or Firm* — McGarry Bair PC

(57) ABSTRACT

A vacuum cleaner includes an upright body mounted to a base that moves over a surface to be cleaned. A rotational coupling can be provided between the upright body and the base for coupling the upright body to the base for movement about at least one rotational axis. The rotational coupling can include at least a swivel joint. A cord rewinder can be provided above the swivel joint for storing and dispensing a power cord.

20 Claims, 10 Drawing Sheets

(56) References Cited

U.S. PATENT DOCUMENTS

| | | | | |
|---|---|---|---|---|
| 3,999,640 | A * | 12/1976 | Persson | A47L 9/26 312/272.5 |
| 5,255,768 | A * | 10/1993 | Kasper | B65H 75/4431 242/379.2 |
| 5,323,510 | A * | 6/1994 | Redding | A47L 5/28 280/47.11 |
| 6,052,862 | A * | 4/2000 | Lowery | A47L 9/26 15/353 |
| 6,349,808 | B1 * | 2/2002 | Bryant | H02G 11/02 191/12.2 A |
| 9,445,701 | B2 * | 9/2016 | Gu | A47L 9/0477 |
| 2002/0008172 | A1 * | 1/2002 | Kim | H02G 11/02 242/385.4 |
| 2010/0269288 | A1 * | 10/2010 | Yoo | A47L 9/26 15/347 |
| 2010/0313378 | A1 * | 12/2010 | Cho | A47L 7/04 15/323 |
| 2010/0319157 | A1 * | 12/2010 | Lee | A47L 9/26 15/323 |
| 2012/0167333 | A1 * | 7/2012 | Hawkins | A47L 9/02 15/323 |
| 2021/0007568 | A1 * | 1/2021 | Tran | A47L 9/26 |

FOREIGN PATENT DOCUMENTS

| | | | | |
|---|---|---|---|---|
| GB | 2470998 | A * | 12/2010 | A47L 7/04 |
| JP | 0375327 | A1 * | 12/1989 | |
| JP | 2237523 | A2 | 9/1990 | |
| JP | h07143956 | A | 6/1995 | |
| JP | 2001061714 | A * | 3/2001 | |
| JP | 2001061714 | A | 3/2001 | |
| JP | 2011142980 | A | 7/2011 | |
| WO | WO-2012075248 | A2 * | 6/2012 | A47L 5/28 |
| WO | 2013080508 | A1 | 6/2013 | |

OTHER PUBLICATIONS

Intellectual Property Office, Combined Search and Examination Report under Sections 17 and 18(3) re Corresponding Application No. GB2020527.4, dated May 7, 2021, 5 pages.

* cited by examiner

VACUUM CLEANER

CROSS-REFERENCE TO RELATED APPLICATION(S)

This application is a continuation of U.S. patent application Ser. No. 16/114,683, filed Aug. 28, 2018, now U.S. Pat. No. 10,791,900, issued Oct. 6, 2020, which claims the benefit of U.S. Provisional Patent Application No. 62/550,903, filed Aug. 28, 2017, all of which are incorporated herein by reference in their entirety.

BACKGROUND

Vacuum cleaners are provided with a vacuum collection system for creating a partial vacuum to suck up debris (which may include dirt, dust, soil, hair, and other debris) from a surface to be cleaned and for collecting the removed debris in a space provided on the vacuum cleaner for later disposal. Vacuum cleaners for household use can be configured as an upright unit having a base for movement across a surface to be cleaned and an upright body pivotally mounted to a rearward portion of the base for directing the base across the surface to be cleaned. The upright body is typically stored in an upright position relative to the base, and reclined relative to the base for operation. Using a handle on the upright body, the user moves the vacuum cleaner over a surface to be cleaned during operation.

BRIEF DESCRIPTION

According to one aspect of the present disclosure a vacuum cleaner, comprising an upright body, a base adapted for movement over a surface to be cleaned and comprising a suction nozzle opening, a working air path which extends from a dirty air inlet to a clean air outlet, a power cord, a suction motor electrically coupled to the power cord and defining a portion of the working air path, a cord rewinder, and an air cooling pathway configured to direct air from the suction motor to the cord rewinder.

DETAILED DESCRIPTION

The present disclosure relates to vacuum cleaners and in particular to upright vacuum cleaners having an upright body pivotally mounted to a base that moves over a surface to be cleaned. In one of its aspects, the present disclosure relates to an upright vacuum cleaner with an improved cord rewinder. In another of its aspects, the present disclosure relates to an upright vacuum cleaner with an improved coupling joint between the upright body and the base.

According to one aspect of the present disclosure, a vacuum cleaner includes an upright body and a base coupled to the upright body by at least a swivel joint, a suction motor located below the swivel joint, and a cord rewinder located above the swivel joint and the suction motor.

According to another aspect of the present disclosure, a vacuum cleaner includes a cord rewinder and an air cooling pathway for the vacuum cleaner that includes a shroud for guiding vacuum cleaner exhaust air to vent holes in fluid communication with an interior of the cord rewinder. For example, the vacuum cleaner can include an upright body, a base coupled to the upright body and adapted for movement over a surface to be cleaned, a cord rewinder, and an air cooling pathway for the cord rewinder that includes a shroud for guiding vacuum cleaner exhaust air to vent holes in fluid communication with an interior of the cord rewinder.

According to yet another aspect of the present disclosure, a vacuum cleaner includes an upright body and a base coupled to the upright body by at least a swivel joint, wherein the swivel joint includes an expandable seal. For example, the vacuum cleaner can include an upright body, a base adapted for movement over a surface to be cleaned and coupled to the upright body, and a rotational coupling between the upright body and the base, wherein the rotational coupling includes a swivel joint permitting movement of the upright body about a first rotational axis relative to the base, wherein the swivel joint includes at least one expandable seal. The expandable seal can be configured to expand under vacuum. The swivel joint can include a swivel on the upright body and a swivel cover at least partially defining a cradle in which the swivel is rotatably mounted. The at least one expandable seal can be provided between the swivel and the swivel cover.

Figure 1:
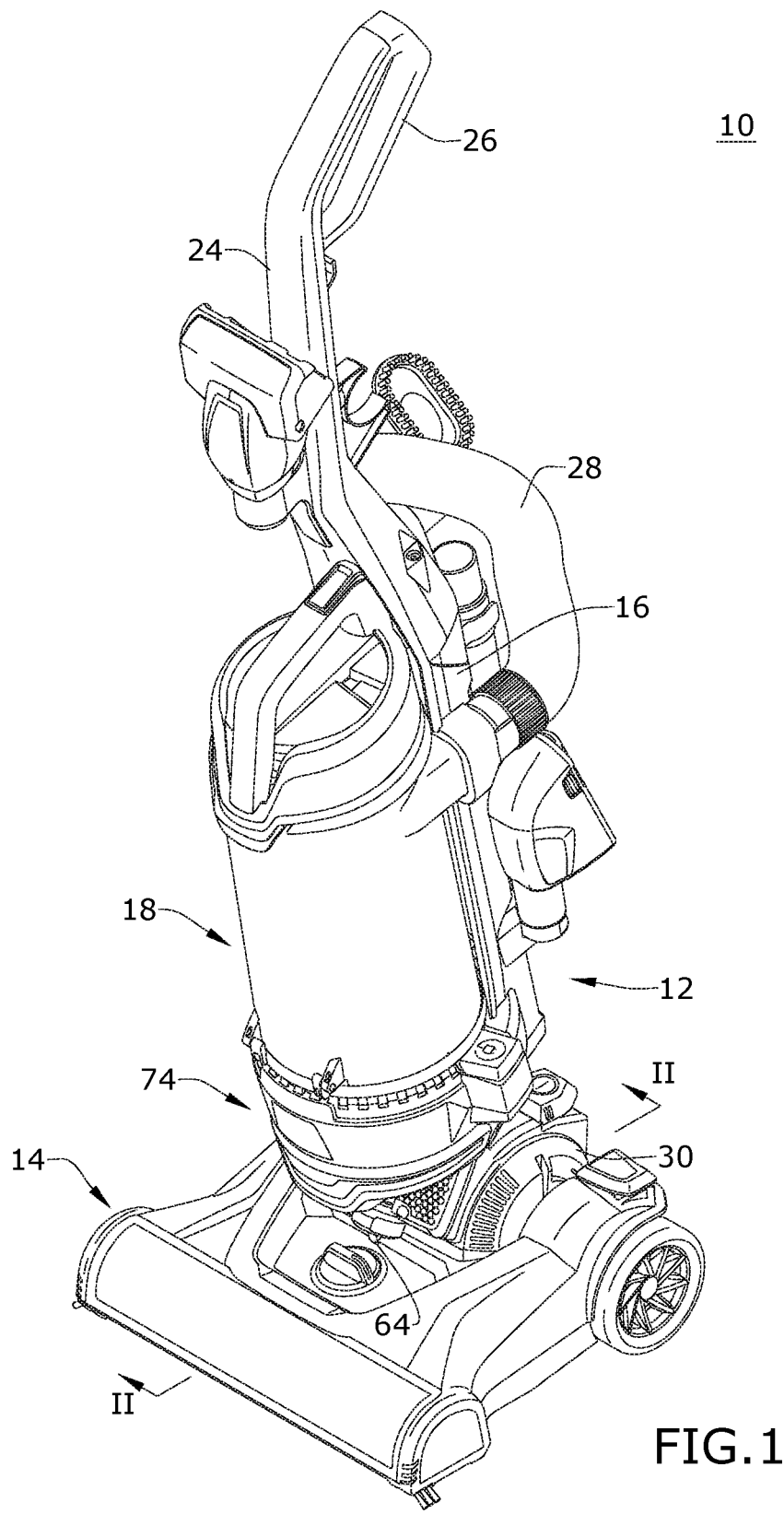
FIG. 1 is a front perspective view of a vacuum cleaner according to an aspect of the present disclosure, with the vacuum cleaner shown in an upright storage position.

For purposes of description related to the figures, the terms "upper," "lower," "right," "left," "rear," "front," "vertical," "horizontal," and derivatives thereof shall relate to the present disclosure as oriented in FIG. 1 from the perspective of a user behind the vacuum cleaner, which defines the rear of the vacuum cleaner. However, it is to be understood that the present disclosure may assume various alternative orientations, except where expressly specified to the contrary.

Figure 2:
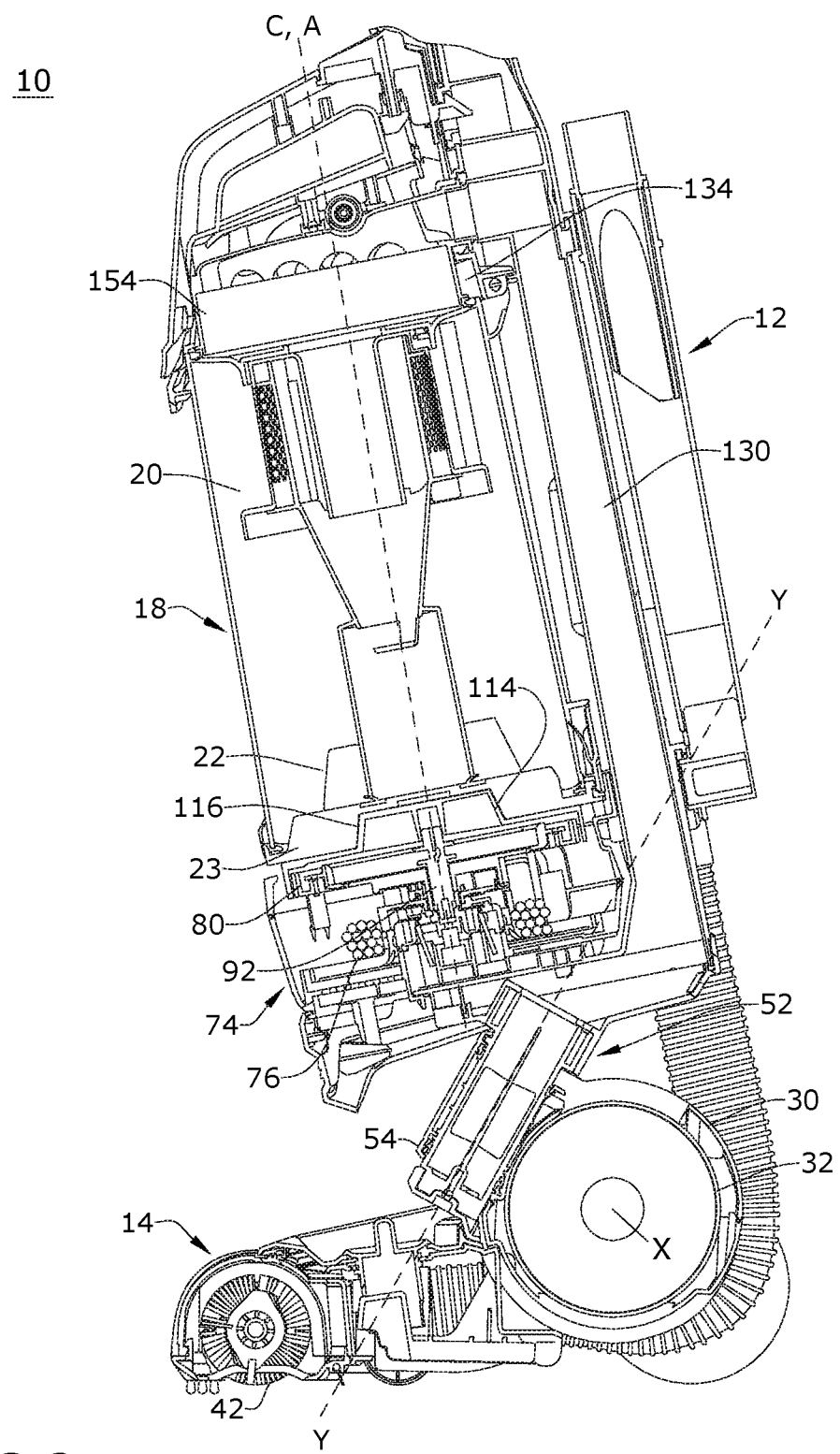
FIG. 2 is a side cross-sectional view of a portion of the vacuum cleaner from FIG. 1.

FIGS. 1-2 show a vacuum cleaner 10 according to a first aspect of the present disclosure. The vacuum cleaner 10 includes a vacuum collection system for creating a partial vacuum to suck up debris (which may include dirt, dust, soil, hair, and other debris) from a surface to be cleaned and collecting the removed debris in a space provided on the vacuum cleaner 10 for later disposal. The vacuum collection system can include a working air path through the vacuum cleaner. In some examples of the present disclosure, not illustrated herein, the vacuum cleaner 10 can additionally have fluid delivery capability, including applying liquid or steam to the surface to be cleaned, and/or fluid extraction capability.

The vacuum cleaner 10 can be provided in the form of an upright vacuum cleaner having an upright body 12 pivotally mounted to a lower base 14 adapted for movement over a surface to be cleaned. The upright body 12 generally includes a main support section or spine 16 supporting a collection assembly 18 for separating and collecting contaminants from a working airstream for later disposal. In one conventional arrangement illustrated herein, the collection assembly 18 can include a cyclone separator 20 for separating contaminants from a working airstream and an integral dirt collector 22 for receiving and collecting the separated contaminants from the cyclone separator 20. The cyclone separator 20 can have a single cyclonic separation stage, or multiple stages. The dirt collector 22 can be provided with a bottom-opening dirt door 23 for contaminant disposal. The collection assembly 18 defines a longitudinal axis C, which is the central axis extending longitudinally through the collection assembly 18 on which the cyclone separator 20 and dirt collector 22 are centered. Alternatively, one or both of the cyclone separator 20 and dirt collector 22 can be offset from the longitudinal axis C.

In another conventional arrangement, the collection assembly 18 can include a separate dirt cup. It is understood that other types of collection assembly 18 can be used, such as centrifugal separators or bulk separators. In yet another conventional arrangement, the collection assembly 18 can include a filter bag. In these alternate arrangements, the dirt cup, centrifugal separator, bulk separator, and/or filter bag can be centered on the longitudinal axis C of the collection assembly 18 or offset therefrom. The vacuum cleaner 10 can also be provided with one or more additional filters upstream or downstream of the collection assembly 18.

The upright body 12 also has an elongated handle 24 extending upwardly from the spine 16 that is provided with a hand grip 26 at one end that can be used for maneuvering the vacuum cleaner 10 over a surface to be cleaned. A hose 28 can form at least a portion of the working air path between the collection assembly 18 and the base 14, and one end of the hose 28 can be configured for removal from communication with the base 14 for optional above-the-floor cleaning.

The upright body 12 can include a motor housing 30 which contains a suction motor 32 positioned therein in fluid communication with the collection assembly 18. The motor housing 30 may be provided at a lower end of the spine 16. As described in further detail below, the motor housing 30 has at least one degree of freedom to move relative to both the upright body 12 and the base 14.

Figure 3:
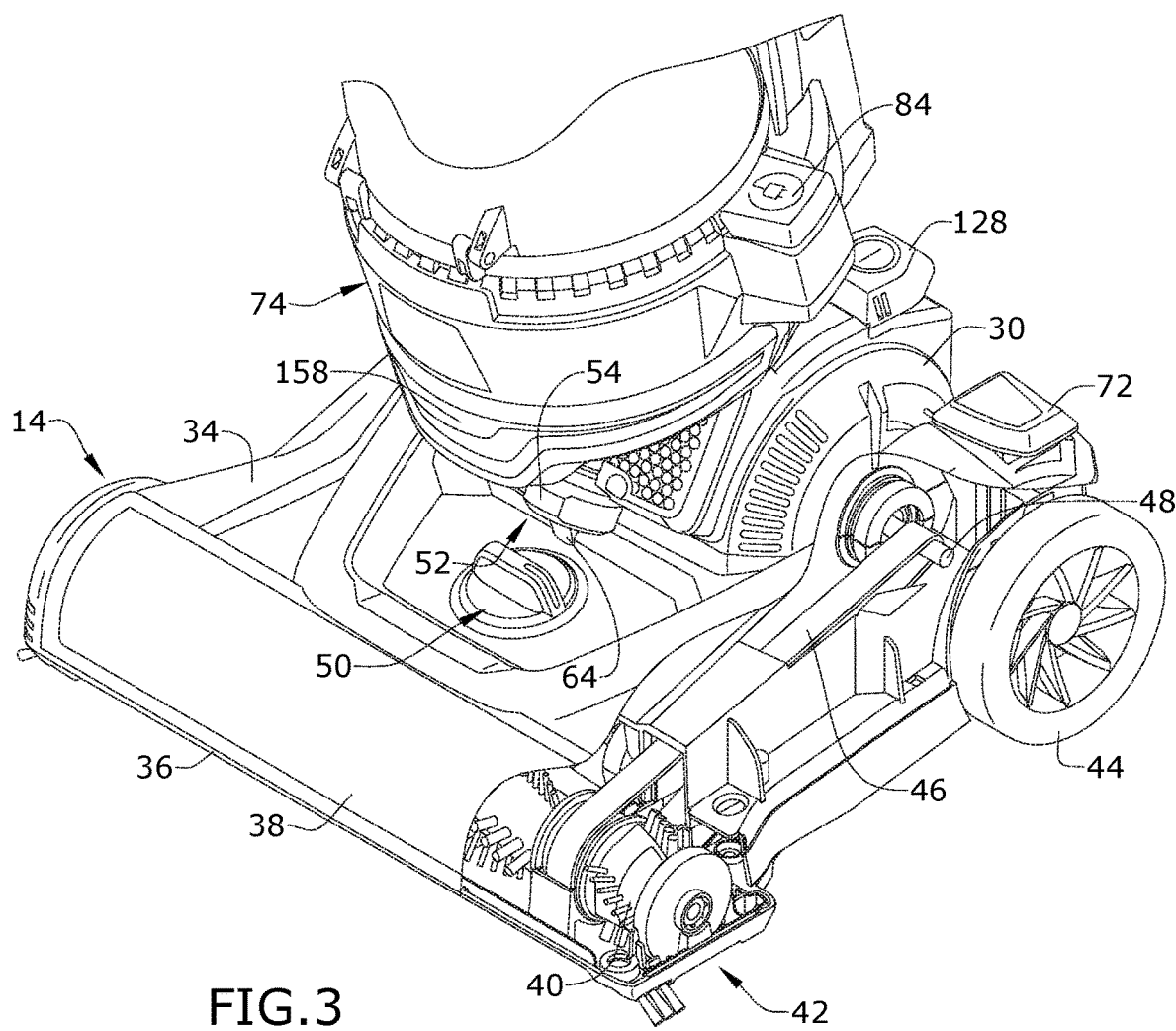
FIG. 3 is a perspective view of a base of the vacuum cleaner from FIG. 1, where the base of the vacuum cleaner is partially cut away to show some internal features of the base.

FIG. 3 is a perspective view of a base 14 of the vacuum cleaner from FIG. 1. In FIG. 3, a portion of the base 14 of the vacuum cleaner 10 is cut away to show some internal features of the base 14. The base 14 can include an upper housing 34 that couples with a lower housing 36 to create a partially enclosed space therebetween. A brushroll chamber 38 can be provided at a forward portion of the base 14 and defines a chamber for receiving a brushroll 40. A suction nozzle opening 42 is formed in the lower housing 36 and is in fluid communication with the brushroll chamber 38 and the collection assembly 18 (FIG. 2). Wheels 44 can be provided on the base 14 for maneuvering the vacuum cleaner 10 over a surface to be cleaned.

The brushroll 40 is positioned within the brushroll chamber 38 for rotational movement about a central longitudinal axis. A single brushroll 40 is illustrated; however, it is within the scope of the present disclosure for dual rotating brushrolls or other agitator configurations, including one or more non-rotating agitators, to be used. Moreover, it is within the scope of the present disclosure for the brushroll 40 to be mounted within the brushroll chamber 38 in a fixed or floating vertical position relative to the brushroll chamber 38 and lower housing 36. In another example, one or more brushrolls or agitators can be provided which are driven for rotation about a vertical axis.

The brushroll 40 can be operably coupled to and driven by the suction motor 32 in the motor housing 30. A drive belt 46 operably connects a shaft 48 of the suction motor 32 to the brushroll 40 for transmitting rotational motion to the brushroll 40. Thus, the vacuum cleaner 10 does not require a separate motor for driving the brushroll 40, which can reduce the product cost. The base 14 can further include an optional suction nozzle height adjustment mechanism 50 for adjusting the height of the suction nozzle opening 42 with respect to the surface to be cleaned. The height adjustment mechanism 50 can include a wheeled carriage which lifts and lowers the front end of the base 14 relative to the surface to be cleaned and rotatable knob provided on the exterior of the base 14 for actuating the adjustment mechanism 50. In other examples of the present disclosure, the suction nozzle height adjustment mechanism can be eliminated.

The components of the vacuum cleaner 10 can be housed or carried on the upright body 12 or base 14 in various combinations. For example, in the example shown herein, the collection assembly 18 and suction motor 32 can be provided on the upright body 12, while the suction nozzle opening 42 and brushroll 40 can be provided on the base 14. Other configurations are possible.

Figure 4:
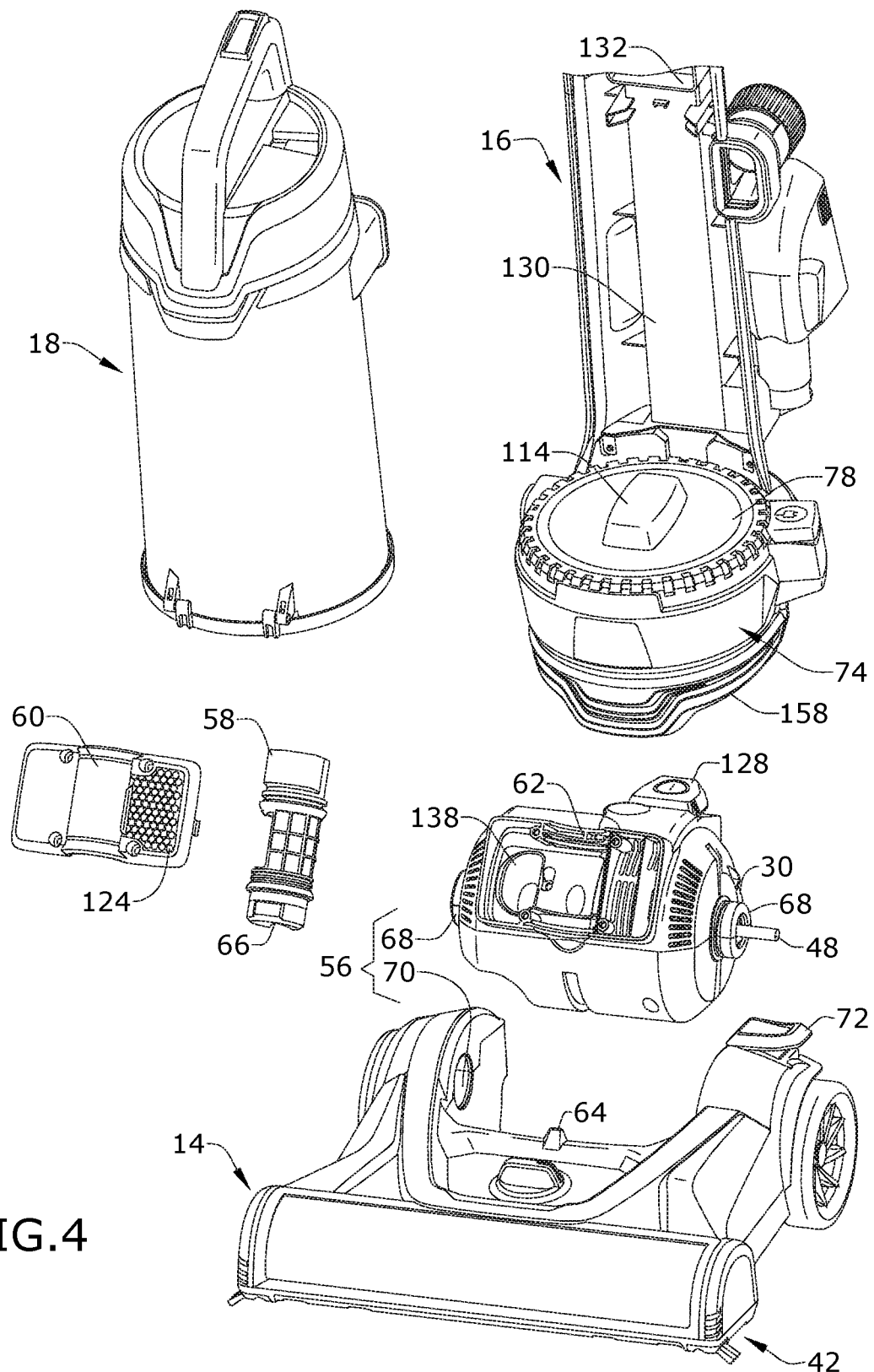
FIG. 4 is a partially exploded view of a portion of the vacuum cleaner from FIG. 1.
Figure 8:
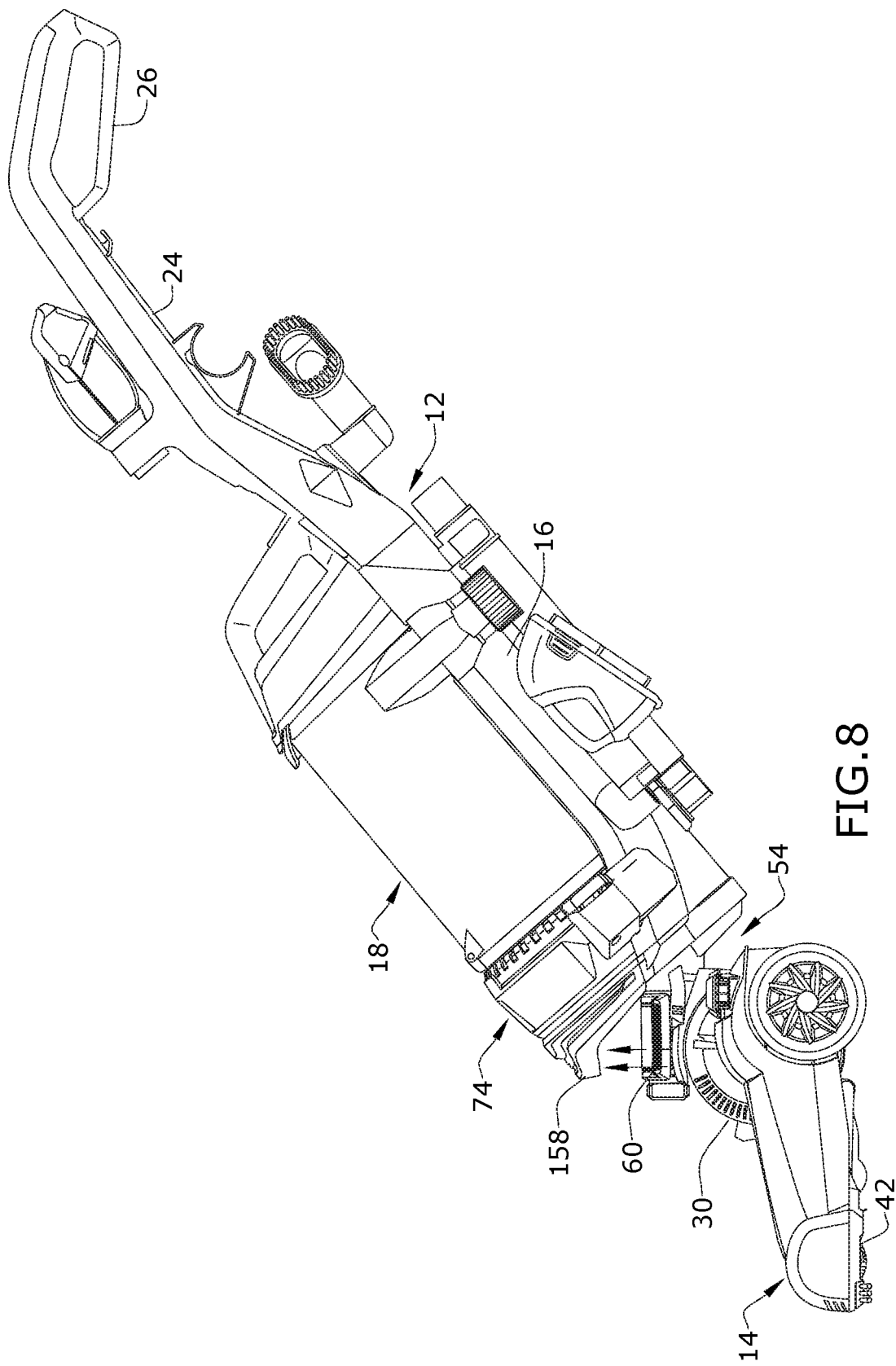
FIG. 8 is a side view of the vacuum cleaner from FIG. 1 in a reclined use position.

The upright body 12 is pivotally mounted to the base 14 for movement between at least an upright storage position shown in FIG. 1 and a reclined use position shown in FIG. 8. Referring to FIGS. 2 and 4, a rotational coupling 52 can be provided between the upright body 12 and the base 14 for coupling the upright body 12 to the base 14 for movement about at least one rotational axis. The rotational coupling 52 of the illustrated example includes at least a swivel joint 54 which permits movement about a first rotational axis Y that extends generally obliquely to the surface over which the base 14 moves and generally along the direction the base 14 travels during normal operation of the vacuum cleaner 10. The rotational coupling 52 can further include a pivot joint 56 which permits movement about a second rotational axis X that is generally perpendicular to the swivel axis Y and extends generally parallel to the surface to be cleaned. Other couplings 52, including those with single or multiple axes of rotation, are possible.

As illustrated, the swivel joint 54 includes a swivel 58 and a swivel cover 60. The swivel 58 is mounted to or otherwise fixed or provided with the upright body 12, such that the upright body 12 moves with the swivel 58 about the swivel axis Y. The swivel 58 is further rotatably mounted in a cradle 62 defined by a portion of the motor housing 30 and a portion of the swivel cover 60, such that the motor housing 30 does not move about the swivel axis Y when the upright body 12 and the swivel 58 move about the swivel axis Y.

A swivel lock can be provided for locking the swivel joint 54 against rotation when the vacuum cleaner 10 is in the upright storage position shown in FIG. 1, and can include a locking protrusion 64 extending upwardly from the base 14 and a corresponding locking recess 66 in the swivel 58. The locking protrusion 64 is positioned to be seated in the locking recess 66 when the upright body 12 is pivoted about the pivot axis X to the upright storage position. Alternatively, the locking protrusion 64 can protrude downwardly from the swivel 58 and the locking recess 66 can be provided in the base 14.

As illustrated, the pivot joint 56 includes pivot shafts 68 provided on opposing sides of the motor housing 30 and corresponding pivot bearings 70 (only one of which is visible in FIG. 4) formed on an inner surface of a rear cavity of the base 14 that provides a space for receiving the motor housing 30. The pivot shafts 68 mounted in the bearings 70 rotatably mount the motor housing 30 for movement about the pivot axis X relative to the base 14. Via the couplings between the motor housing 30 and the swivel 58, and between the swivel 58 and the upright body 12, the upright body 12 also moves with the motor housing 30 about the pivot axis X.

The vacuum cleaner 10 can further be provided with a detent mechanism for selectively locking the upright body 12 in the upright storage position, against rotation about the pivot axis X. In the illustrated example, the detent mechanism includes a detent pedal 72 pivotally mounted to the base 14 for selectively releasing the vacuum cleaner 10 from the upright storage position and allowing the upright body 12 to pivot to the reclined use position.

Figure 6:
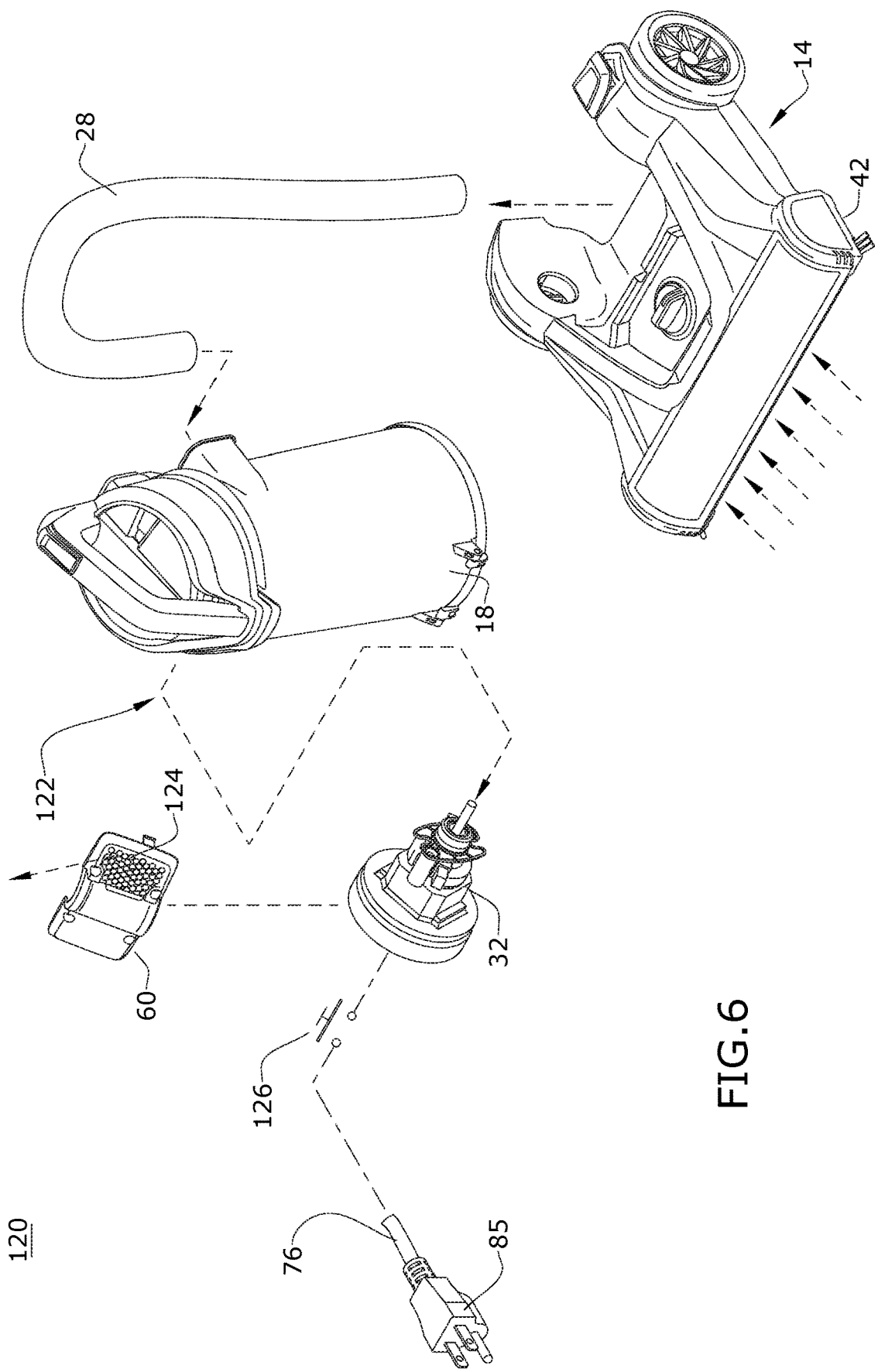
FIG. 6 is a schematic view of a vacuum collection system of the vacuum cleaner from FIG. 1.

The vacuum cleaner 10 further includes a cord rewinder 74 that selectively stores and dispenses a power cord 76 (FIGS. 2 and 6). The cord rewinder 74 enables the power cord 76 to be stored within the vacuum cleaner 10, thereby avoiding the need to manually wind the power cord 76 around an exterior portion of the vacuum cleaner 10 after a cleaning operation.

Figure 5:
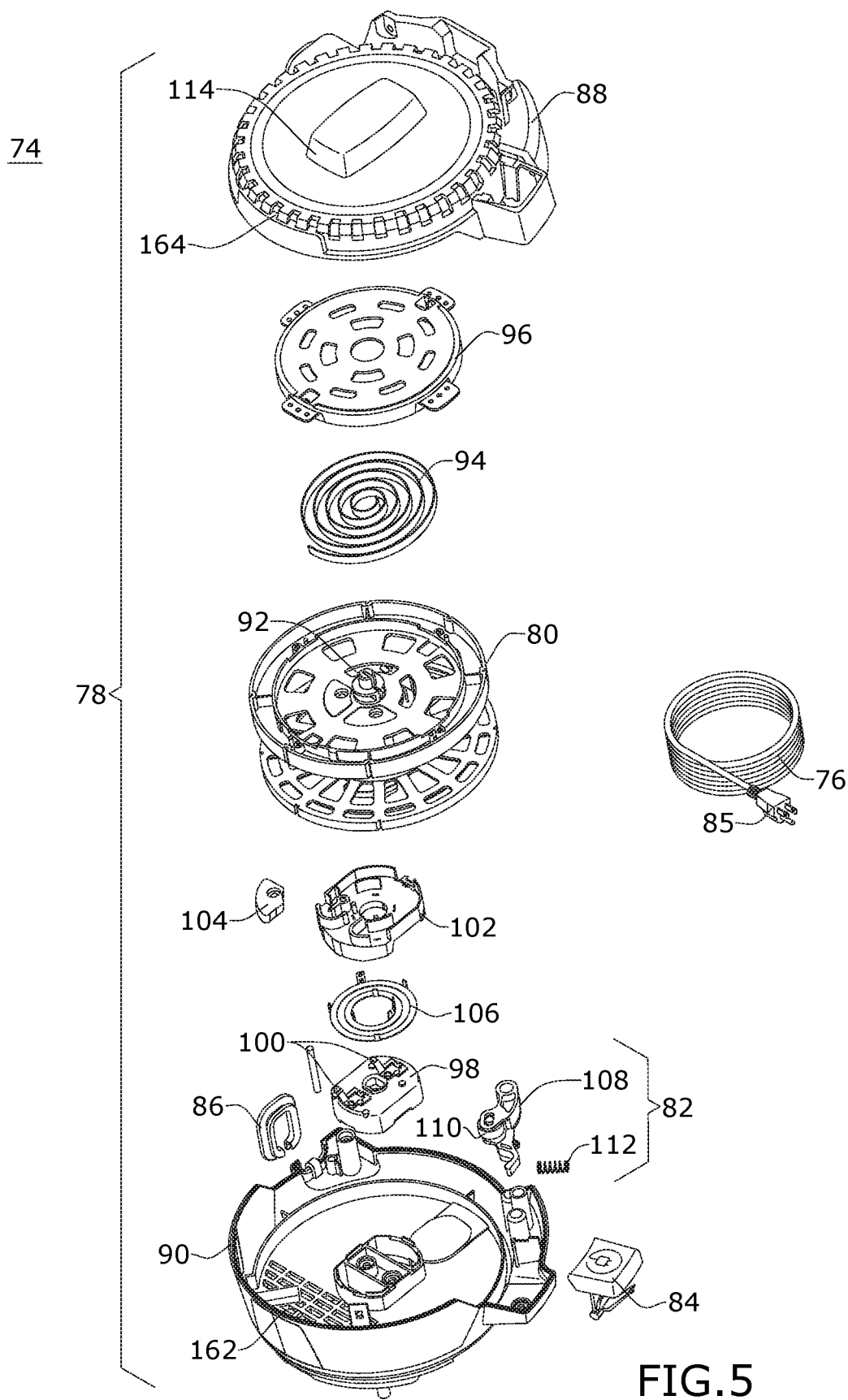
FIG. 5 is an exploded view of a cord rewinder of the vacuum cleaner from FIG. 1.

Referring to FIG. 5, the cord rewinder 74 includes a cord reel housing 78, which is stationary or fixed relative to the upright body 12 of the vacuum cleaner, and a spool or cord reel 80 rotatably mounted within the cord reel housing 78 for winding the power cord 76. The cord rewinder 74 can further include a brake assembly 82 and an actuator 84.

The power cord 76 is electrically coupled to a circuit (not shown) for supplying electrical power to the electrically-operated components of the vacuum cleaner 10, such as the suction motor 32. A portion of the power cord 76 is secured to the cord reel 80, and the cord 76 is fed through the cord reel housing 78 such that an end of the power cord 76 having a plug 85 is on the exterior of the cord reel housing 78. The cord reel housing 78 can include a recessed opening surrounded by a cord ring 86 in which the plug 85 is received when the power cord 76 is completely wound about the cord reel 80. The cord reel housing 78 is illustrated herein as including an upper housing 88 and a lower housing 90, although other configurations of the cord reel housing 78 are possible.

The cord reel 80 is rotatably mounted to the housing 78, and is operable to rotate in a first direction to take up the power cord 76, and also to rotate in a second, opposing direction to dispense the power cord 76. The cord reel 80 is coaxially and rotatably mounted on an axle 92 that rotates relative to the cord reel housing 78 as the cord 76 is unwound and rewound on the cord reel 80.

A reel spring 94 is provided between the cord reel housing 78 and the cord reel 80 and is operative to apply a winding force on the cord reel 80 to rotate the cord reel 80 in the first direction to take up the power cord 76. The reel spring 94 can, for example, be a coil spring or spiral torsion spring. One end of the reel spring 94 is coupled to the cord reel 80 and the opposite end is coupled to a spring cover 96, which is mounted or fixed to the stationary cord reel housing 78. For example, the spring cover 96 can include at least one tab that engages a recessed portion of the cord reel housing 78. Thus the cord reel 80 and one end of the reel spring 94 rotate with respect to the spring cover 96, which is held stationary by the cord reel housing 78.

The cord rewinder 74 can further include a contact housing 98, which is mounted or fixed to the cord reel housing 78, and which mounts at least one electrical contact 100 in electrical communication with the electric system of the vacuum cleaner 10. In the illustrated example, the at least one electrical contact 100 can include multiple V-shaped spring contacts. The spring contacts 100 are connected to electric leads that connect to the electric system of the vacuum cleaner 10. The electric leads can include a coiled cord, for example, extending from the spring contacts 100, through the lower housing 90 and motor housing 30 to the suction motor 32.

The power cord 76 can be secured to a cord mount frame 102 mounted to the cord reel 80 with a cord clamp 104. Slip rings 106, such as continuous conductive strips, are mounted on the bottom of the cord mount frame 102. Electric leads from the power cord 76 are connected to the slip rings 106. The slip rings 106 contact the spring contacts 100, which are configured to deflect slightly in order to maintain electrical connection as the cord reel 80, cord mount frame 102 and slip rings 106 rotate with respect to the stationary spring contacts 100.

The brake assembly 82 is mounted to a portion of the cord reel housing 78 for releasably locking the cord reel 80 in a desired position once the power cord 76 has been unwound from the cord reel 80 a desired amount. The brake assembly 82 can include a spring-loaded arm 108 pivotally mounted relative to the cord reel 80, a brake wheel 110 rotatably mounted in a slotted hole in the arm 108, and a spring 112 positioned between the cord reel housing 78 and the arm 108 for biasing the arm 108 toward an engaged position in which the brake wheel 110 is engaged with the cord reel 80. The brake assembly 82 also has a disengaged position in which the brake wheel 110 is disengaged from the cord reel 80. When the brake wheel 110 is engaged, the brake wheel 110 prevents the cord reel 80 from rotating the first direction, while permitting rotation of the cord reel 80 in the second direction. When the brake wheel 110 is disengaged, the cord reel 80 is free to rotate in the first direction to wind up the power cord 76 under the biasing force of the reel spring 94.

The actuator 84 of the cord rewinder 74 is configured to release the brake assembly 82, and allow the cord reel 80 to rotate under the biasing force of the reel spring 94 to wind up the power cord 76. Depressing the actuator 84, which is shown herein as a button accessible from the exterior of the cord reel housing 78 and from the exterior of the vacuum cleaner 10, releases the brake assembly 82.

Referring to FIG. 4, the cord rewinder 74 can define a platform on which the collection assembly 18 is removably supported. In the illustrated example, the upper surface of the cord reel housing 78 forms the platform. The cord reel housing 78 can be provided with a locator feature 114 that is received in a correspondingly shaped recess 116 in the bottom of the collection assembly 18 in order to properly orient the collection assembly 18 on the platform. When the collection assembly 18 is mounted on the platform, the locator feature 114 can be at least partially or fully received by the recess 116. The locator feature 114 prevents installation of the collection assembly 18 until is it properly aligned with the recess 116. In addition to the cord rewinder 74, in some examples the collection assembly 18 may be supported by the spine 16 or another portion of the upright body 12.

Referring to FIG. 2, the cord rewinder 74 defines a cord reel axis A about which the cord reel 80 rotates. For example, the axis A can be defined by the axle 92 of the cord reel 80. In one example, the axis A can be parallel to the longitudinal axis C of the collection assembly 18; more particularly, the cord rewinder axis A and the longitudinal axis C can be identical or coincident, such that the cord rewinder 74 and collection assembly 18 are coaxially oriented.

Referring to FIGS. 2-3, the swivel joint 54 of the vacuum cleaner 10 is located generally above the motor housing 30, which permits the shaft 48 of the suction motor 32 to drive the brushroll 40 via the drive belt 46. For example, the swivel joint 54 may be located at an upper, forward side of the motor housing 30, as seen shown in FIG. 2. This configuration is less costly than conventional swivel designs for vacuum cleaners, which place a suction motor above the joint, and thus require a separate brushroll motor in the base to drive the brushroll. Additionally, the cord rewinder 74 is located above both the swivel joint 54 and the suction motor 32. With the suction motor 32 spaced away from the cord rewinder 74, heat transfer from the suction motor 32 to the cord rewinder 74 is reduced, allowing for improved cooling of the cord rewinder 74. In addition, placing the cord rewinder 74 above the swivel joint 54, rather than mounting it below the swivel joint 54 within the motor housing 30, reduces the required envelope size of the motor housing 30, providing a more compact footprint for the vacuum cleaner 10, which improves maneuverability of the vacuum cleaner 10.

FIG. 6 is a schematic view of the vacuum collection system 120 of the vacuum cleaner 10. The vacuum collection system 120 can include a working air path 122 through the vacuum cleaner 10, which extends from a dirty air inlet to a clean air outlet, and may include one or more of the suction nozzle opening 42, the suction motor 32 in fluid communication with the suction nozzle opening 42 for generating a working air stream, and the collection assembly 18 for separating and collecting debris from the working airstream for later disposal. The working air path 122 can further include various air conduits for fluid communication between the various components of the vacuum collection system 120, including, but not limited to, the vacuum hose 28. The suction motor 32 can be positioned downstream of the collection assembly 18 in the working air path 122. In other examples, the suction motor 32 may be located fluidly upstream of the collection assembly 18.

In the illustrated example, the dirty air inlet of the working air path 122 is defined by the suction nozzle opening 42 for on-the-floor cleaning and an end of the vacuum hose 28 for above-the-floor cleaning. The clean air outlet of the working air path 62 is defined by an exhaust opening 124 on the vacuum cleaner.

A portion of the electrical system of the vacuum cleaner 10 is also shown in FIG. 6. The suction motor 32 can be electrically coupled to the power cord 76, which may be plugged into a household electrical outlet. A suction power switch 126 between the suction motor 32 and the power cord 76 can be selectively closed by the user upon pressing a suction power button 128 (FIG. 3), thereby activating the suction motor 32. The suction power switch 126 and button 128 may also activate the brushroll 40, or a separate actuator for the brushroll may be provided.

Figure 7:
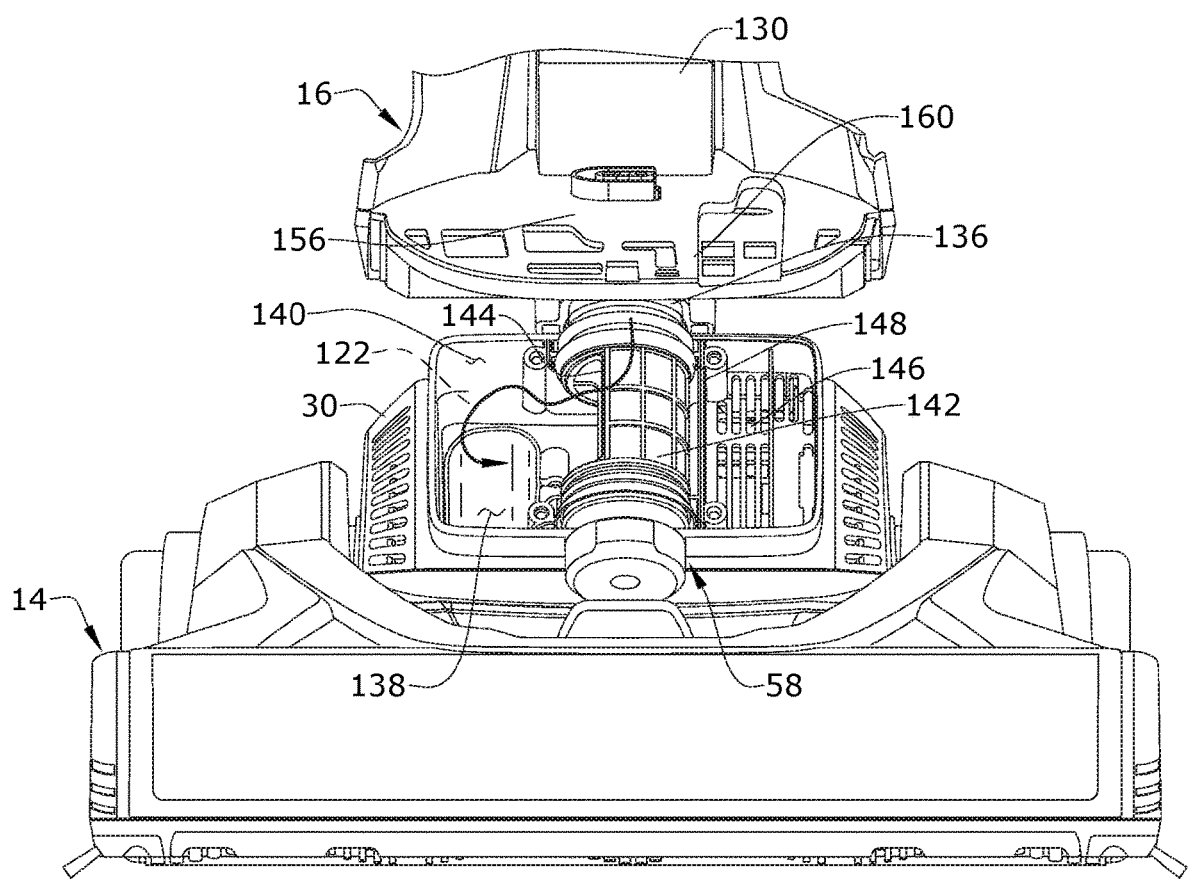
FIG. 7 is a front view of the vacuum cleaner from FIG. 1, with components removed to illustrate a working air path through the vacuum cleaner.

Referring to FIGS. 2, 4 and 7, the working air path 122 between the collection assembly 18 and the suction motor 32 can include a duct 130 extending downwardly through the spine 16 that has an upper inlet end 132 in fluid communication with an air outlet 134 of the collection assembly 18 and a lower outlet end 136 in fluid communication with the swivel joint 54. The portion of the working air path 122 through the swivel joint 54 is fluidly connected to a motor air inlet 138 of the motor housing 30 via a working air chamber 140 formed between the swivel joint 54 and the motor housing 30. In the illustrated example, the working air chamber 140 is specifically formed between the swivel 58, the swivel cover 60, and the motor housing 30. Also as illustrated, the interior of the swivel 58 can be at least partially hollow to define a swivel air conduit 142 therethrough in fluid communication with the lower outlet end 136 of the spine duct 130 and in fluid communication with the working air chamber 140 via an outlet port 144 through a side of the swivel 58.

Figure 9:
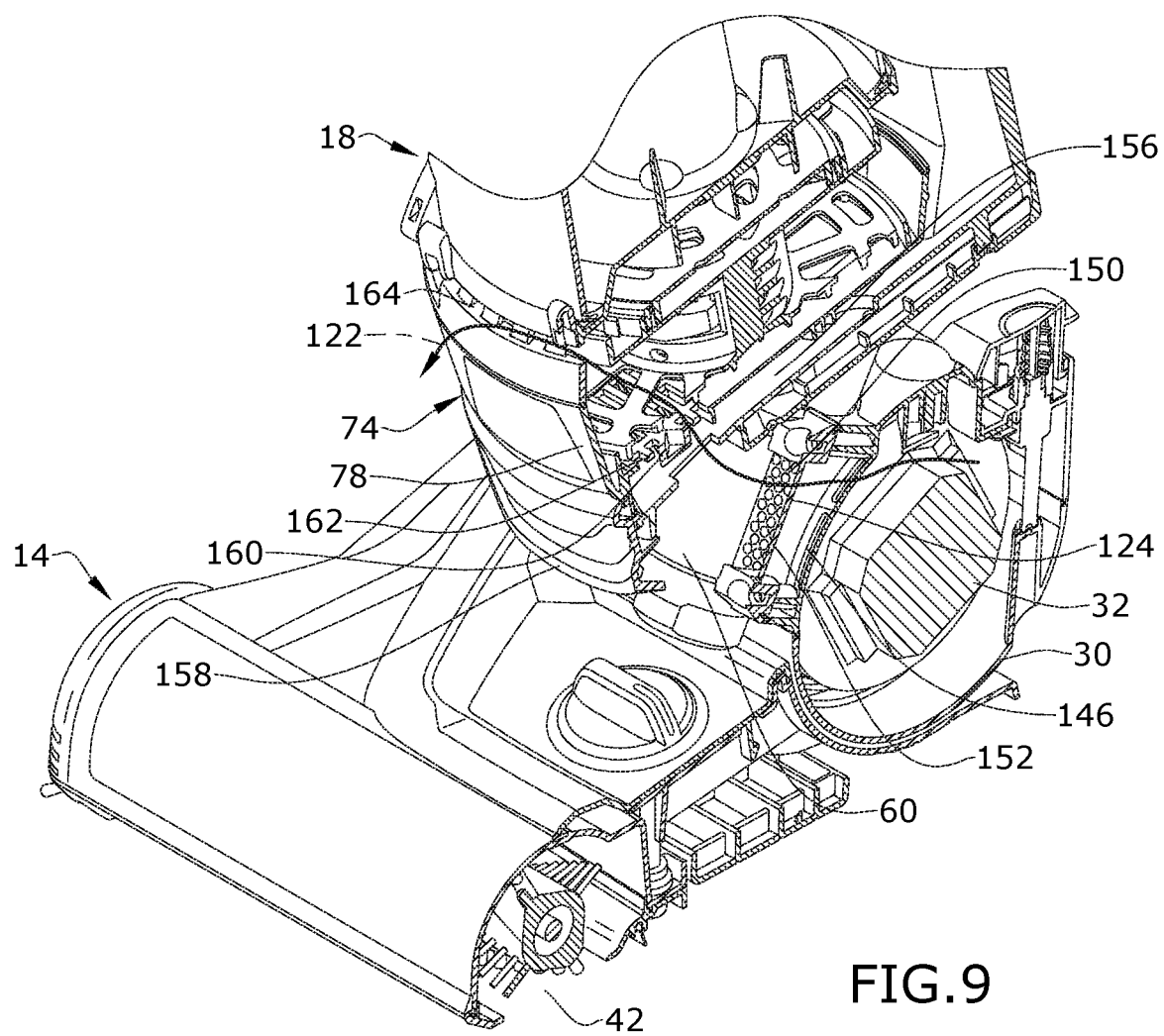
FIG. 9 is a cross-sectional view of a portion of the vacuum cleaner from FIG. 1 showing a portion of a working air through the vacuum cleaner, with a power cord removed for clarity.

Referring to FIGS. 7-9, a motor air outlet 146 is formed in an opposite end of the motor housing 30 from the motor air inlet 138, and is isolated from the motor air inlet 138 and working air chamber 140 by a partition 148. In the illustrated example, the partition 148 is formed by mating ribs in the motor housing 30 and the swivel cover 60. The ribs can be mated using a tongue and groove fitting, or another suitable joint.

The motor air outlet 146 is in fluid communication with the exhaust opening 124. In the illustrated example, the exhaust opening 124 is formed in the swivel cover 60, although in other examples, the exhaust opening 124 can be separate from the swivel cover 60. A portion of the swivel cover 60 can be provided with a plurality of vents 150 defining the exhaust opening 124. As noted above, the swivel cover 60 can also define the working air chamber 140 connected to the motor air inlet 138. As such, the portion of the swivel cover 60 forming the working air chamber 140 can be solid or otherwise impermeable to air.

In the illustrated example, the exhaust opening 124 is provided fluidly downstream of a post-motor filter 152 located fluidly downstream of the motor air outlet 146. The post-motor filter 152 can be a permanent exhaust filter mounted on the backside of the swivel cover 60, over the vents 150, which does not need to be accessible to the user for cleaning or replacement. The permanent exhaust filter 152 can include various types of filter media, including melt-blown polypropylene or polyester media, or porous foam, for example. In other examples, a non-permanent exhaust filter 152 can be provided.

A pre-motor filter 154 is optionally provided in the working air path 122 between the cyclone separator 20 and the motor air inlet 138. As shown in FIG. 2, the pre-motor filter 154 can be provided within the collection assembly 18, upstream of the air outlet 134. The vacuum collection system 120 can also be provided with one or more additional filters upstream or downstream of the collection assembly 18 or the suction motor 32.

Referring to FIGS. 7 and 9, the spine 16 defines a platform 156 on which the cord rewinder 74 is mounted. In the illustrated example, the platform 156 is formed at a lower end of the spine 16, and protrudes forwardly above the swivel joint 54. In addition to the platform 156, in some examples the cord rewinder 74 may be supported by the upwardly extending portion of the spine 16 forming the duct 130.

Referring to FIGS. 8-9, the cord rewinder 74 is further located above the clean air outlet, illustrated herein as exhaust opening 124. When the vacuum cleaner 10 is reclined, as shown in FIG. 8, the exhaust opening 124 faces an underside of the cord rewinder 74, and exhaust air, as indicated by arrows in FIG. 8, from the vacuum cleaner 10 is directed upwardly to cool the cord rewinder 74. Exhaust air from the suction motor 32 exits the motor housing 30 through the motor air outlet 146, and passes through the vents 150 in the swivel cover 60. A shroud 158 traps a portion of the exhaust air stream exiting the vacuum cleaner 10 for use as cooling air, and guides the cooling air upwardly, through vent holes 160, 162 formed in the platform 156 and cord reel housing 78. The shroud 158 of the illustrated example is located beneath a lower portion of the upright body 12 and includes a substantially vertical wall extending below the cord rewinder 74 for trapping or diverting and guiding the exhaust air toward the cord rewinder 74.

The vent holes 162 in the cord reel housing 78 can be provided in the lower housing 90, and form cooling air inlets into the cord rewinder 74. Vent holes 164 can also be provided in the upper housing 88 and form cooling air outlets from the cord rewinder 74 to the exterior of the vacuum cleaner.

In the illustrated example, the cooling pathway for the cord rewinder 74 extends partially exteriorly of the vacuum cleaner 10, as the exhaust air is exhausted out of the vacuum cleaner 10 and through the ambient environment before reaching the cord rewinder 74. This cooling pathway can provide superior cooling when compared with prior art cord winders cooled via an internal cooling pathway, as exhaust air that is exposed to the ambient environment may be cooler than exhaust air remains internal to a vacuum cleaner. The partially-exterior cooling pathway, the shroud 158, and the vent holes 160, 162, 164 provide superior cooling and temperature reduction of the cord rewinder 74.

It is noted that, in other examples, the shroud 158 can be eliminated, and since the exhaust opening 124 faces an underside of the cord rewinder 74, exhaust air from the vacuum cleaner 10 is still directed generally upwardly toward the cord rewinder 74 to cool the cord rewinder 74. However, absent the shroud 158, much less exhaust air will pass through the cord rewinder 74, resulting in less cooling of the cord rewinder 74 and increased temperature during operation of the cord rewinder 74.

It is also noted that, in other examples, any of the vent holes 160, 162, 164 in the platform 156 and cord reel housing 78 can be eliminated, and since the exhaust opening 124 faces an underside of the cord rewinder 74, exhaust air from the vacuum cleaner 10 is still directed generally upwardly toward the cord rewinder 74 to cool the cord rewinder 74. However, absent the vent holes 160, 162, the exhaust air can only indirectly lower the temperature of the cord rewinder 74 by cooling the bottom of the upright body 12, resulting in less cooling of the cord rewinder 74 and increased temperature during operation of the cord rewinder 74.

Figure 10:
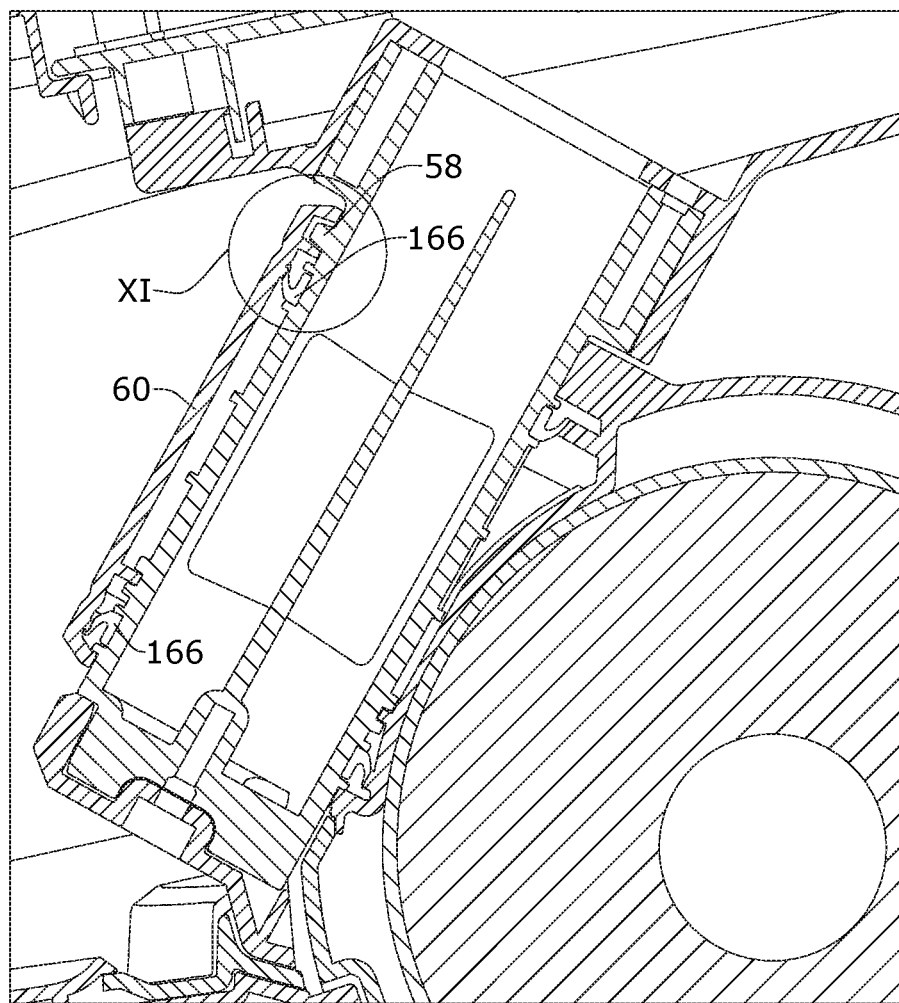
FIG. 10 is a side cross-sectional view of a portion of the vacuum cleaner from FIG. 1 showing a swivel joint of the vacuum cleaner from FIG. 1.
Figure 11:
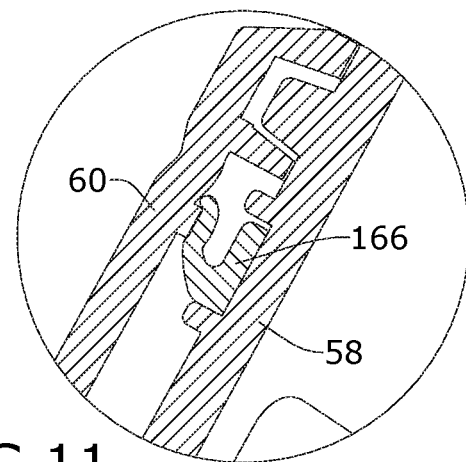
FIG. 11 is a close-up view of Section XI of FIG. 10.

Referring to FIGS. 10 and 11, at least one seal 166 can optionally be provided between the swivel 58 and the swivel cover 60 to prevent vacuum leaks. In one example, two seals 166 can be provided; one seal 166 between and upper portion of the swivel 58 and swivel cover 60 and another seal 166 between a lower portion of the swivel 58 and swivel cover 60. The seal 166 can be a flexible and expandable seal mounted between the swivel 58 and the swivel cover 60. The seal 166 is also configured to slip relative to the swivel 58 and the swivel cover 60 so as not to impede the function of the swivel 58. Under vacuum, as generated by the suction motor 32, the seal 166 can expand to prevent working air leaks and debris from entering the swivel joint 54. Air leaks reduce the overall performance of the vacuum cleaner 10 and debris can cause excess friction, which can impede facile and proper function of the swivel 58. It is noted that similar flexible, expandable, slippery seals can be used in other applications including a rotatable joint, such as a rotatable joint between a vacuum hose 28 and dirt collector 22, for example. In one example, the seal 166 can be a thin ferrule or bellows type seal. One example of a suitable material for the seal 166 is a plastic with a low coefficient of friction, such as, but not limited to, nylon.

The vacuum cleaner 10 can be used to effectively clean a surface by removing debris (which may include dirt, dust, soil, hair, and other debris) from the surface in accordance with the following method. The sequence of steps discussed is for illustrative purposes only and is not meant to limit the method in any way as it is understood that the steps may proceed in a different logical order, additional or intervening steps may be included, or described steps may be divided into multiple steps, without detracting from the present disclosure.

To perform vacuum cleaning, the power cord 76 is pulled out from the cord rewinder 74 module and plugged into a household electrical outlet. The power button 128 is pressed thereby activating the suction motor 32, and optionally the brushroll 40. The suction nozzle opening 42 is moved over the surface to be cleaned via movement of the base 14, generally in a series of forward and backward strokes. The brushroll 40 can agitate debris on the surface so that the debris is more easily ingested into the suction nozzle opening 42. The suction motor 32 draws in debris-laden air through the suction nozzle opening 42 and into the collection assembly 18 where the debris is substantially separated from the working air. The air flow then passes the suction motor 32, and continues through the working air path 122 to the exhaust opening 124. A portion of the exhaust air stream exiting the vacuum cleaner 10 cools the cord rewinder 74. The collection assembly 18 can be periodically emptied of debris. When vacuum cleaning is done, the power cord 76 can be unplugged from the household electrical outlet and rewound by the cord rewinder 74.

The vacuum cleaner disclosed herein provides an improved cord rewinder. One advantage that may be realized in the practice of some examples of the described vacuum cleaner is that an air cooling pathway for the vacuum cleaner that includes a shroud for guiding vacuum cleaner exhaust air to vent holes in fluid communication with an interior of the cord rewinder.

The vacuum cleaner disclosed herein further provides an improved coupling joint between the upright body and the base. One advantage that may be realized in the practice of some examples of the described vacuum cleaner is that the coupling joint, and in particular the swivel joint of the coupling joint, is located above the motor. This permits a single motor to generate the working air flow and also to drive the brushroll, such as via a flat stretch belt. This configuration is less costly than conventional swivel joint designs, which place the vacuum motor above the joint, and thus require a separate foot motor to drive the brushroll.

Another advantage that may be realized in the practice of some examples of the described vacuum cleaner is that the coupling joint, and in particular the swivel joint of the coupling joint, forms a portion of a working air path through the vacuum cleaner and, with the cord rewinder spaced above the motor, can direct exhaust air toward the cord rewinder for cooling.

Another advantage that may be realized in the practice of some examples of the described vacuum cleaner is that the coupling joint, and in particular the swivel joint of the coupling joint, forms a portion of a working air path through the vacuum cleaner and includes an expandable seal between the moving components of the swivel joint to prevent vacuum leaks.

To the extent not already described, the different features and structures of the vacuum cleaner 10 may be used in combination with each other as desired. That one vacuum cleaner is illustrated as having all features disclosed herein is not to be construed that it must have all of the features, but is done for brevity of description. For example, embodiments of the cord rewinder 74 and expansible seal 166 can be employed independently of each other. Thus, the various features of the vacuum cleaner 10 can be mixed and matched as desired to form new embodiments, whether or not the new embodiments are expressly described.

The written description uses examples to disclose the present disclosure, including the best mode, and also to enable any person skilled in the art to practice the present disclosure, including making and using any devices or systems performing any incorporated methods. The patentable scope of the present disclosure is defined by the claim, and may include other examples that occur to those skilled in the art. Such other examples are intended to be within the scope of the claims if they have structural elements to do not differ from the literal language of the claims, or if they include equivalent structural elements with insubstantial differences from the literal languages of the claims.

What is claimed is:

1. A vacuum cleaner, comprising:
   an upright body;
   a base adapted for movement over a surface to be cleaned and comprising a suction nozzle opening;
   a working air path which extends from a dirty air inlet to a clean air outlet;
   a power cord;
   a suction motor electrically coupled to the power cord and defining a portion of the working air path;
   a cord rewinder; and
   an air cooling pathway configured to direct air from the suction motor to the cord rewinder, the air cooling pathway extending partially exteriorly of the vacuum cleaner upstream of the cord rewinder.

2. The vacuum cleaner of claim 1 wherein the cord rewinder is located vertically above the clean air outlet.

3. The vacuum cleaner of claim 1, further comprising a shroud extending from a lower portion of the upright body, the shroud in at least partial register with the clean air outlet.

4. The vacuum cleaner of claim 3 wherein the cord rewinder comprises a cord reel housing fixed relative to the upright body and a cord reel rotatably mounted within the cord reel housing for winding the power cord, wherein a portion of the power cord is secured to the cord reel and the cord reel is operable to rotate in a first direction to take up the power cord, and to rotate in a second, opposing direction to dispense the power cord.

5. The vacuum cleaner of claim 4 wherein an upper surface of the cord reel housing defines a platform on which a collection assembly is removably supported and comprises a locator feature, and wherein the collection assembly comprises a recess shaped correspondingly to the locator feature and configured to at least partially receive the locator feature.

6. The vacuum cleaner of claim 5 wherein at least one of the cord reel housing or the platform further comprises vent openings formed therein and the vent openings define a portion of the air cooling pathway.

7. The vacuum cleaner of claim 3 wherein the air cooling pathway extends from the clean air outlet exteriorly through the ambient environment to an interior of the cord rewinder.

8. The vacuum cleaner of claim 1, further comprising a swivel joint coupling the upright body and the base and wherein the swivel joint comprises a swivel on the upright body and a swivel cover at least partially defining a cradle in which the swivel is rotatably mounted.

9. The vacuum cleaner of claim 8 wherein the upright body comprises a motor housing, which contains the suction motor, and the cradle is further defined by a portion of the motor housing, such that the swivel is rotatably mounted between the motor housing and the swivel cover.

10. The vacuum cleaner of claim 8 wherein the swivel is at least partially hollow to form a portion of the working air path, and define a swivel air conduit therethrough in fluid communication with a collection assembly and the suction motor.

11. The vacuum cleaner of claim 8 wherein the clean air outlet is defined by an exhaust opening formed in the swivel cover, wherein the exhaust opening faces an underside of the cord rewinder when the upright body is reclined relative to the base.

12. The vacuum cleaner of claim 1, further comprising a swivel joint coupling the upright body and the base and wherein the upright body comprises a motor housing, which contains the suction motor, the swivel joint is located at an upper, forward side of the motor housing, and a portion of the working air path extends through the swivel joint.

13. The vacuum cleaner of claim 1 wherein the upright body comprises a motor housing which contains the suction motor, the upright body comprises a spine supporting a collection assembly, and the motor housing is provided at a lower end of the spine.

14. The vacuum cleaner of claim 13 wherein the spine defines a platform on which the cord rewinder is mounted, and the platform is formed at the lower end of the spine.

15. The vacuum cleaner of claim 14 wherein the platform further comprises vent openings formed therein and the vent openings define a portion of the air cooling pathway.

16. A vacuum cleaner, comprising:
   an upright body;
   a base adapted for movement over a surface to be cleaned and comprising a suction nozzle opening;
   a working air path which extends from a dirty air inlet to a clean air outlet;
   a collection assembly defining a portion of the working air path;
   a rotational coupling between the upright body and the base, wherein the rotational coupling comprises a swivel joint permitting movement of the upright body about a first rotational axis relative to the base;
   a power cord;
   a suction motor electrically coupled to the power cord and defining a portion of the working air path, the suction motor having a motor air outlet;
   a cord rewinder located above the suction motor; and
   an air cooling pathway for the cord rewinder that directs exhaust air from the motor air outlet to the cord rewinder, wherein a portion of the air cooling pathway extends exteriorly through the ambient environment prior to reaching the cord rewinder.

17. The vacuum cleaner of claim 16 wherein the air cooling pathway includes a shroud guiding exhaust air to an air inlet in fluid communication with an interior of the cord rewinder.

18. The vacuum cleaner of claim 16, further comprising a shroud extending from a lower portion of the upright body and including a wall extending below the cord rewinder and in at least partial register with the clean air outlet.

19. The vacuum cleaner of claim 18 wherein at least one of the shroud or the wall further comprises vent openings formed therein and the vent openings define a portion of the air cooling pathway.

20. The vacuum cleaner of claim 16 wherein the cord rewinder is located vertically above the clean air outlet.

* * * * *